May 29, 1951

G. NEMNICH 2,555,200

MEANS FOR PREPARING FUEL AND AIR MIXTURES
FOR INTERNAL-COMBUSTION MOTORS

Filed July 26, 1948

INVENTOR
GUSTAV NEMNICH
BY
ATTORNEY

May 29, 1951

G. NEMNICH 2,555,200

MEANS FOR PREPARING FUEL AND AIR MIXTURES
FOR INTERNAL-COMBUSTION MOTORS

Filed July 26, 1948

INVENTOR
GUSTAV NEMNICH.
BY
ATTORNEY

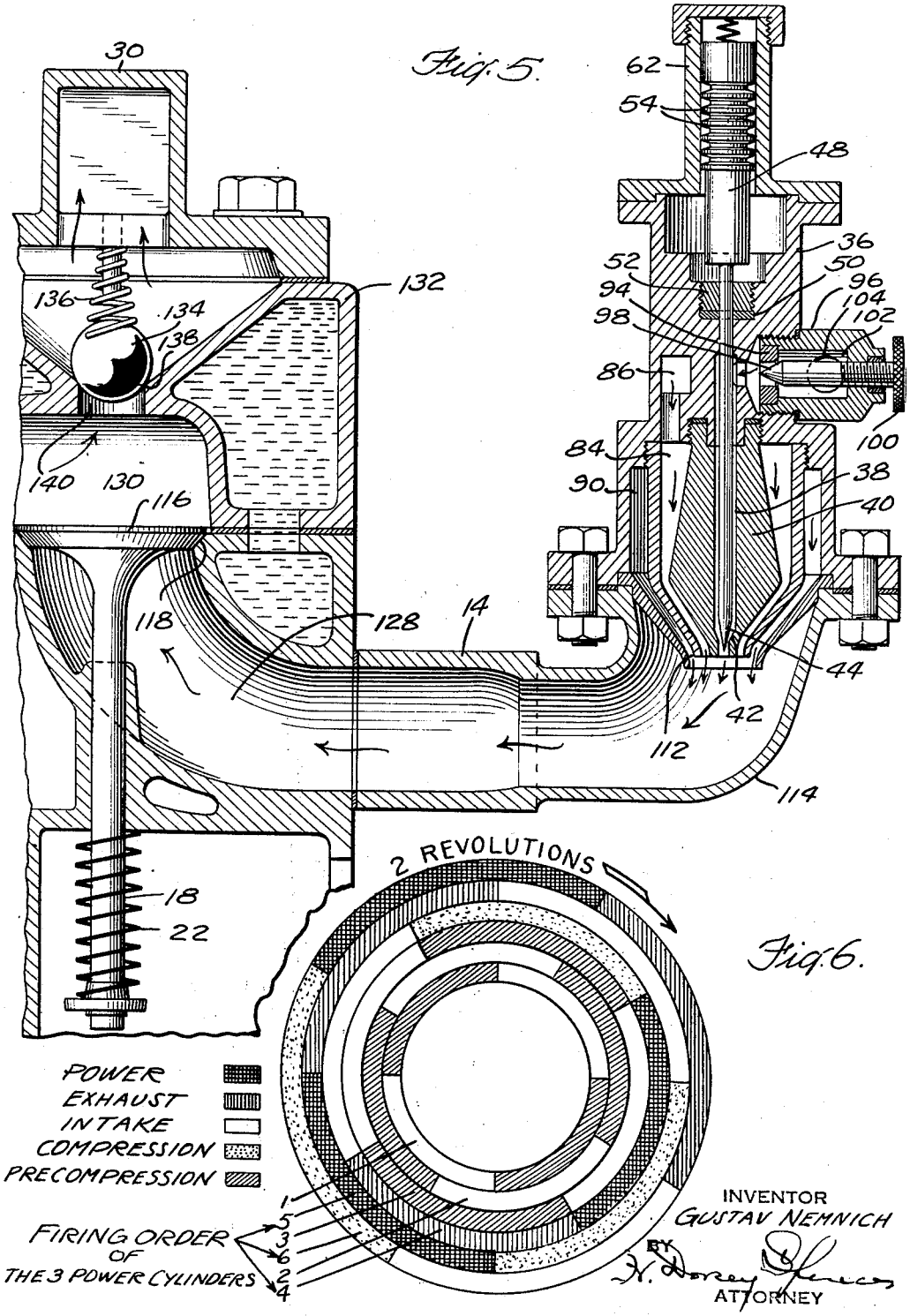

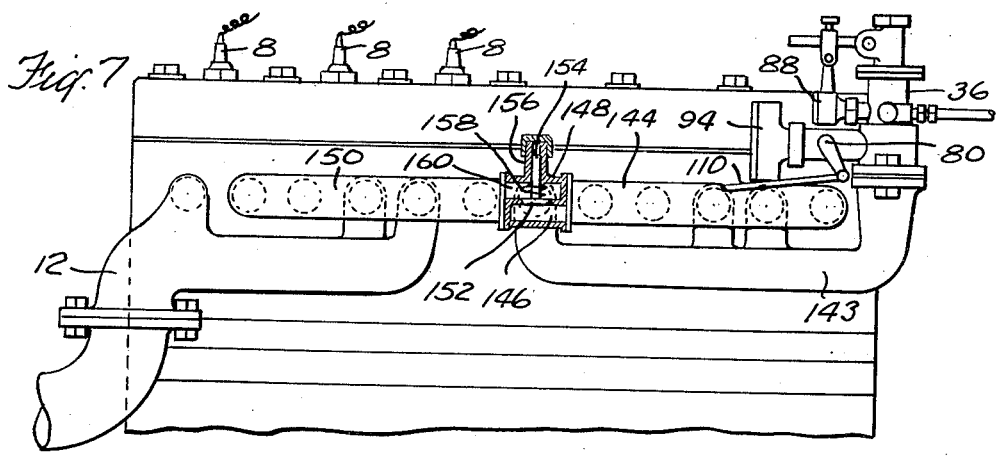
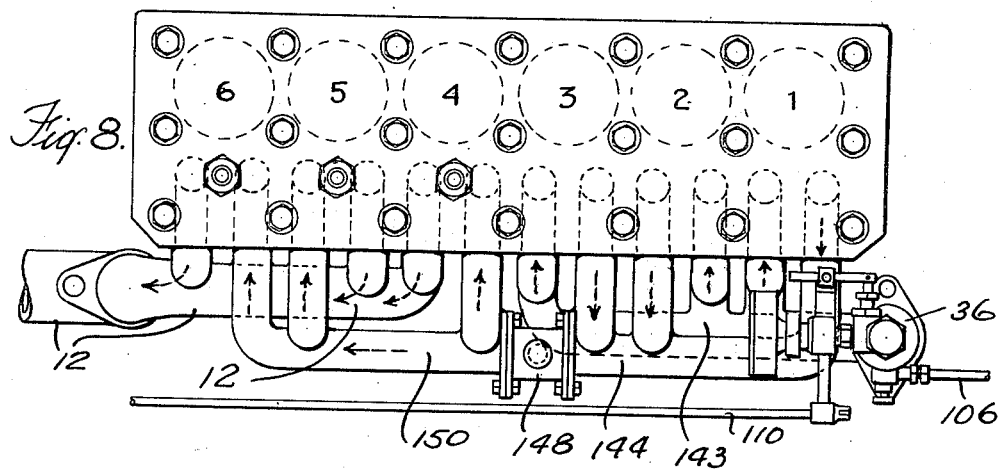
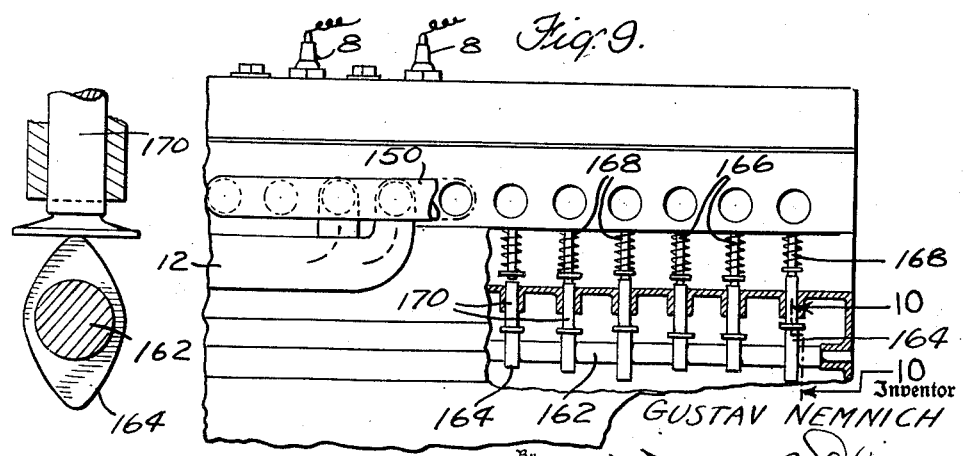

Patented May 29, 1951

2,555,200

UNITED STATES PATENT OFFICE 2,555,200

MEANS FOR PREPARING FUEL AND AIR MIXTURES FOR INTERNAL-COMBUSTION MOTORS

Gustav Nemnich, Huntington, N. Y., assignor of one-fourth to Wilson H. Madden, Huntington, N. Y.

Application July 26, 1948, Serial No. 40,676

2 Claims. (Cl. 123—59)

This invention relates to internal combustion motors and has for its general object to improve the efficiency of operation of such motors, particularly in respect to the fuel consumption for a given horsepower.

In internal combustion motors as now usually constructed and operated, the fuel mixture for the explosive charge in the motor cylinder is obtained by atomizing the fuel in a carburetor on the intake or suction stroke of the motor piston, the suction produced by the intake stroke of the motor piston drawing air through the carburetor, atomizing the fuel and carrying the mixture into the intake manifold from which it is drawn into the appropriate cylinder. With increases in speed of rotation of the ordinary internal combustion motor the time allowed for atomization of the fuel and its mixing with the air which furnishes the oxygen for combustion becomes shorter with each increase in speed, with the result that the efficiency of most internal combustion motors, so far as fuel consumption is concerned, falls off at high speeds.

Where reliance is had entirely upon the intake or suction stroke of the piston of an internal combustion motor both to draw air through the atomizing elements of the carburetor and to draw the charge from the intake manifold into the cylinder it will be seen that, with the reduction in the time provided for this operation at increased speeds, there is bound to be a falling off in the efficiency of the carburization and in the thoroughness of the diffusion of the vaporized fuel and air throughout each other before the introduction of the combustible mixture into the motor cylinder, with the result that there is not as complete combustion as might take place if more care were expended in getting a fuel and air mixture of ideal proportions and thorough diffusion.

A particular object of the present invention, therefore, is to provide means for increasing the effectiveness both of the vaporization of the fuel and of its diffusion in the air that supplies the oxygen for combustion and also for insuring the introduction into the cylinder on the intake stroke of the piston, no matter at what speed the motor is running, of an explosive charge made up of a mixture of air and fuel in proportions substantially perfect for complete combustion and in quantity sufficient to insure the most effective power stroke. To this end the invention aims to provide improved means for atomizing the fuel and mixing therewith a suitable proportion of air to insure complete combustion and also for putting the fuel and air mixture under a preliminary pressure before its introduction into the intake manifold whereby the intake of the fuel and air mixture into the power cylinder will be accelerated and assisted by the preliminary pressure to which the explosive mixture has been subjected.

In the illustrative embodiment of the invention advantage is taken of the increased efficiency resulting from the improved means and method of carburization and the improved means for insuring introduction of an adequate and proper fuel mixture into the power cylinder to utilize a part of the cylinders of existing multi-cylinder internal combustion motors for effecting the initial compression of the fuel and air mixture, leaving the power production of the motor to the remaining cylinders. As just suggested, the increase in the efficiency resulting from a more complete use of the fuel which is brought about by the present invention results in the production of substantially the same or an increased overall power by the utilization of only three cylinders of a six cyinder engine for power production.

It will be understood, however, that the invention is equally applicable to existing internal combustion motors without a reduction in the number of cylinders used for power production or the utilization of any of these cylinders for the preliminary compression, the preliminary compression being effected by auxiliary compressing means arranged to operate in like manner. When, as herein shown, the precompressing cylinders are driven from the same crank shaft as the power cylinders, it will be observed that the piston in each of the precompressing cylinders has, in a 4-cycle engine, two intake strokes and two compressing strokes for each power stroke of the power pistons. It will further be seen that this is advantageous in insuring both an adequate and thoroughly mixed supply of vaporized fuel and air and a sure precompression of this mixture to insure adequate feeding of the explosive mixture to the power cylinders, or the intake manifold therefor, prior to the power stroke of each power piston.

Other objects, important features and advantages of the invention to which reference has not specifically been made hereinabove will appear hereinafter when the following description and claims are considered in connection with the accompanying drawings, in which—

Figure 5 is a section on the line 5—5 of Figures 1 and 2;

Figure 6 is a timing diagram showing the relationship of the intake, compression, power and exhaust strokes of the pistons;

Figure 7 is a side elevation of a 6-cylinder motor having the invention embodied therein in a preferred form;

Figure 8 is a plan view of the motor shown in Figure 7;

Figure 9 is a side elevation of the forward end of the motor shown in Figure 7 with parts broken away to show the arrangement of the valve stem pushers, and Figure 10 is a sectional detail on the line 10—10 of Figure 9 showing one of the valve lifting cams and the lower end of a valve pusher.

Figure 1:
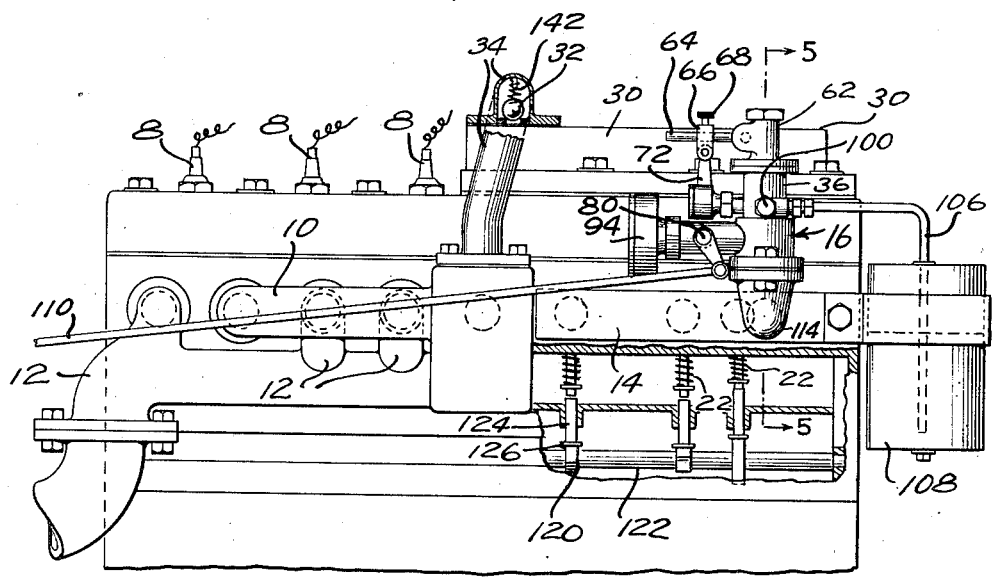
Figure 1 is a side elevation of a 6-cylinder combustion engine of the 4-cycle type modified to utilize three of the cylinders as precompression cylinders and the other three as power cylinders to carry out the principles of operation of the present invention.

As hereinabove suggested, the invention is shown in the drawings as embodied in an ordinary 6-cylinder 4-cycle internal combustion motor in such manner that half of the cylinders that formerly were used for power production are now utilized for insuring the intake of a proper mixture of fuel and air and a preliminary compression of this mixture to facilitate its thorough diffusion and its proper introduction into the power cylinders. As further hereinabove suggested, however, the invention is not limited to utilizing cylinders formerly utilized for power production for the purposes of this invention.

Figure 2:
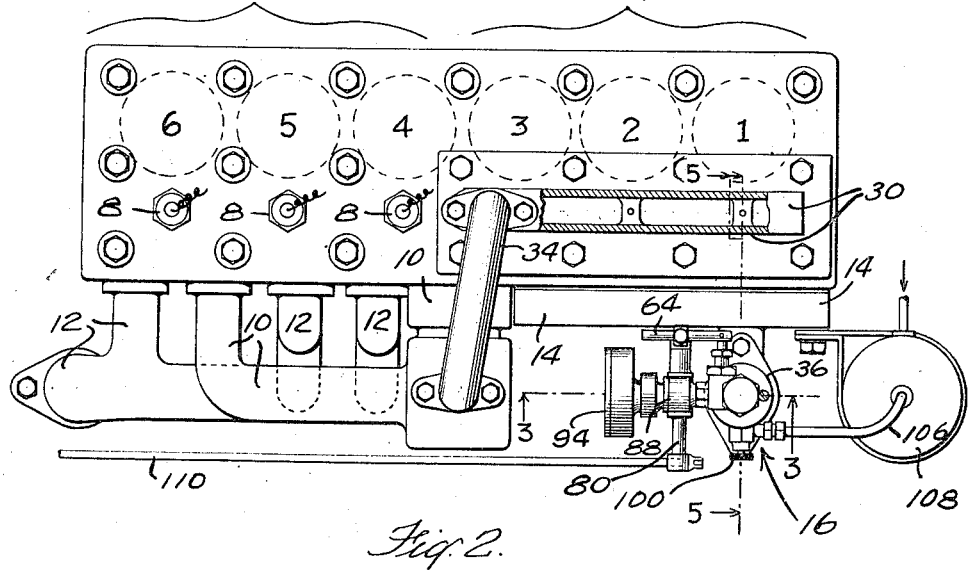
Figure 2 is a plan view of the internal combustion motor shown in Figure 1.

As shown in Figures 1 and 2 of the drawings, the three cylinders at the left hand end of the internal combustion motor there shown are still utilized for the production of power and the three cylinders at the right hand end of the motor shown in Figures 1 and 2 have their spark plugs omitted and the valve timing so modified that these cylinders prepare the fuel charges for the left hand cylinders to insure a maximum efficiency of power production by the left hand group of cylinders.

For convenience in description, the cylinders of the internal combustion motor herein shown are given their usual numbering for timing purposes beginning with the No. 1 cylinder at the right and ending with the No. 6 cylinder at the left.

The construction and operation of cylinders 4, 5 and 6 remains the same as in any 6-cylinder internal combustion motor, each of the cylinders being provided with a spark plug 8, with an intake valve, not shown, communicating with an intake manifold 10, and an exhaust valve, not shown, communicating with an exhaust manifold 12. The right hand group of cylinders 1, 2 and 3 has been modified, as hereinabove suggested, to prepare the mixture for and assist its introduction into the cylinders 4, 5 and 6 and to this end all firing connections to the cylinders 1, 2 and 3 have been eliminated, the exhaust valves have been disconnected from the exhaust manifold and both the exhaust and intake valves have been brought into communication with an initial intake manifold 14 which, in turn, is connected to a carburetor indicated generally by the reference numeral 16. The former intake and exhaust valves, the stems 18 and 20 of which for some of the cylinders 1, 2 and 3 are shown in Figure 1, may be held in seated position by springs 22 and 24 and opened by the suction produced by the intake strokes of the pistons in the cylinders 1, 2 and 3, alone, or these valves may be opened at the proper times by suitable valve opening cams such, for example, as the cams 120 shown in Figure 1, operating respectively through an associated plunger 124 on the valve stems 18 and 20 of its associated cylinder. By thus modifying the timing of what was formerly an exhaust valve so that it opens with the intake valve, it will be seen that, upon each movement of the piston in one direction, suction will be exerted on the carburetor 16 and, since both valves now open into the manifold 14, this suction stroke of the piston will draw in a mixture of fuel and air from the carburetor into the manifold 14 and from the manifold into the cylinder. It will further be seen that the closing of these two valves on the return stroke of the piston will cause the mixture in the cylinder to be compressed and delivered to a second manifold 30 communicating, through a check valve 32, with a conduit 34 connecting the manifold 30 with the intake manifold 10 for the power producing cylinders 4, 5 and 6.

There being two of these suction strokes and two compression strokes for each two rotations of the crank shaft essential to completion of the cycle of a 4-cycle internal combustion motor, it will be seen that if the carburetor adjustment were left the same as it was when only one of the two strokes was used as a suction stroke, there would be a greater intake of fuel than would usually be necessary to supply the combustion needs of the cylinders 4, 5 and 6. Preferably, therefore, the intake for each suction stroke of the pistons of the cylinders 1, 2 and 3 is adjusted to supply its part of the explosive charge which, by reason of the improved preliminary treatment, may be a more efficient charge than that heretofore furnished to the power cylinders.

I have found in practice that, with the preliminary treatment which is given the explosive charge delivered to the power cylinders, after the fuel has been atomized in the carburetor and mixed with the air, I can increase the proportion of air to fuel in the charge because of the more complete diffusion of the fuel in the air and thus secure more complete combustion, with a resulting economy in fuel. The reason for this will be apparent from a study of the mechanism now to be described by which effective atomization of the fuel is obtained, a thorough diffusion of the fuel in the oxygen supplying air and a precompression of the mixture are brought about before introduction into the power cylinders.

In the illustrative embodiment of the invention, the carburetor 16 is shown as comprising a cast housing 36 having a central fuel passage 38 extending through a part thereof and through an extension piece 40 projecting into the chambered lower end of said housing 36. This fuel passage 38 is provided at its lower end with a valve seat 42 for a needle valve 44 having a valve stem 46 extending upwardly through the fuel passage 38 and connected at its upper end to a vertical plunger 48, the stem 46 passing through a stuffing box 50 having a gland 52. The plunger 48 is provided with rack teeth 54 extending circumferentially thereabout, these teeth meshing with a pinion 56 mounted on a cross shaft 58 in a lateral enlargement 60 in the housing 62 for the plunger 48.

A crank arm 64 on the shaft 58 is provided with a sleeve 66, adjustable lengthwise of said arm and securable in adjusted position by set screw 68. The lower part of the sleeve 66 is formed as a yoke to receive the eye 70 at the upper end of a link 72, a short pivot 74 connecting the eye 70 and yoke part of the sleeve 66. A second eye 76 at the lower end of the link 72 receives an eccentric 78 on the shaft 80 on which the air intake valve 82 is carried. As the shaft 80 is turned in a clockwise direction in Figure 3 to increase the intake of air into the carburetor it will be seen that the eccentric 78 will be turned in the direction to pull the link 72 down, thus raising the needle valve 44 and permitting a greater intake of fuel to mix with the increased intake of air.

It will be noted that two concentric air intake passages surrounding the discharge end of the fuel passage 38, the inner one 84 of these communicating with the air intake 86 provided with an air filter 88. The outer passage 90 communicates with the air intake 92 controlled by the valve 82 and provided with an air filter 94.

The fuel for making the fuel and air mixture is introduced into the central fuel passage 38 through a valve comprising a valve seat 94 in a lateral housing 96 screwed into the housing 36. The conical valve 98 which cooperates with the valve seat 94 is carried on a stem threaded through the end of the lateral housing 96 opposite the valve seat and provided with a burred adjusting head 100. A central chamber 102 in the housing 96 communicates through a lateral opening 104 and tube 106 with the usual float tank 108 or other source of fuel supply. The adjustment of the valve 98 in respect to the seat 94 determines the rate of intake of the fuel into the passage 38. This adjustment is usually such that when the valve 82 for the air passage 92 is substantially in its closed position the air intake 86 will draw in sufficient gasoline through the valve 98 and through the valve 44, which is then in its most nearly closed position, to provide the idling mixture for the motor.

Figure 3:
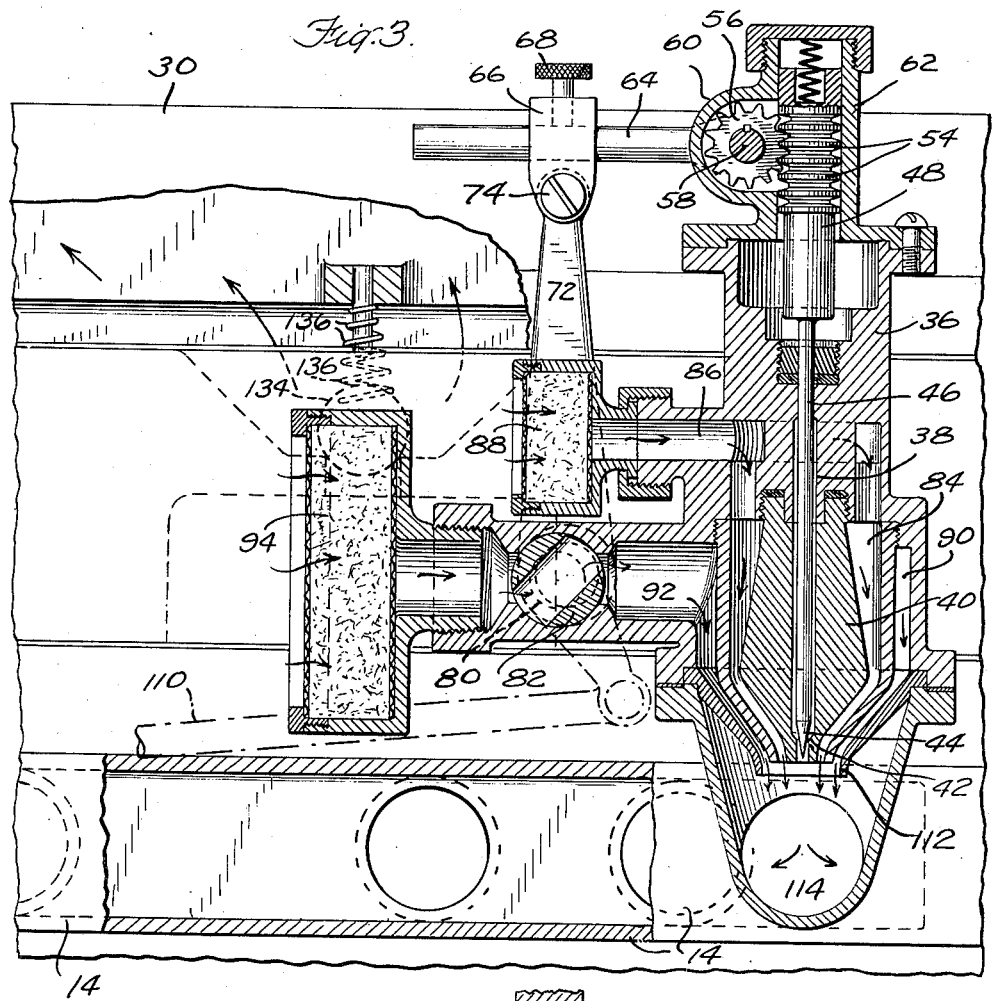
Figure 3 is a section on the line 3—3 of Figure 2.
Figure 4:
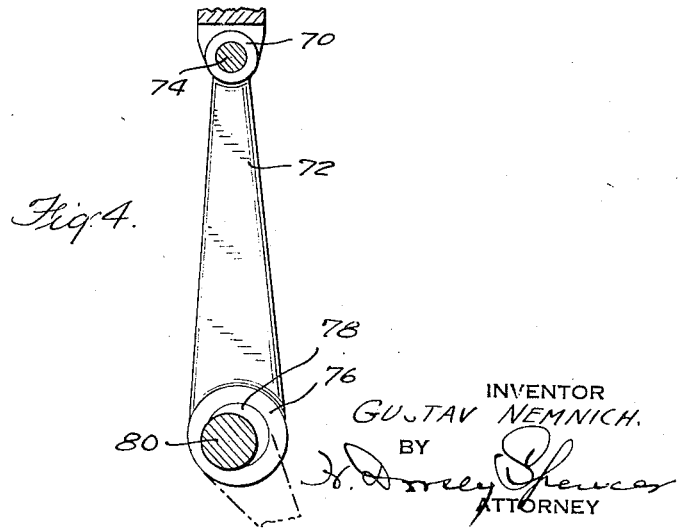
Figure 4 is a detail view showing the eccentric connection between the main air intake throttle and the needle valve control mechanism.

It will be seen that, as the valve 82 in the air passage 92 is moved toward its open position by any suitable connection to the accelerator, such as the rod or link 110, the turning of the valve 82 in the clockwise direction in Figure 3 will pull down on the link 72, through its connections to the eccentric 78, and rock the pinion 56 in a counter-clockwise direction in Figure 3, thus raising the valve 44 to permit a greater intake of fuel therethrough. The air drawn in through the passage 92, as above stated, travels down through the outer concentric air passage 90 into the tapered outlet 112 of the carburetor or atomizer, thus by its Venturi effect increasing not only the flow of fuel through the valve 44 but also the flow of air through the passage 86 which communicates with the passage 84 immediately surrounding the valve 44, whereby a thorough atomization of the fuel and its thorough commingling with and diffusion throughout the incoming air is brought about.

The air and fuel mixture thus produced is, as shown in Figures 2 and 3, introduced through a communicating tube 114 into the intake manifold 14 for the precompression cylinders 1, 2 and 3. As further above pointed out, each of these cylinders is now provided with two valve controlled intake passages thereinto, one of these being the valve controlled passage formerly used for carrying off the exhaust, this passage being now in communication with the intake manifold 14. As shown in greater detail in the sectional view, Figure 5, the valve 116 there shown is one of the valves, the stems 18 of which have been referred to hereinabove, this valve being normally held against its seat 118 by a spring 22. As also hereinabove pointed out, the opening of this valve may be brought about either directly by the suction action of the suction stroke of the piston of the cylinder with which the valve is associated, or properly timed valve operating cams 120 on a cam shaft 122 may be employed to effect such opening, these cams 120 serving at the proper times to lift plungers 124 which have heads 126 extending beneath the lower ends of valve stems for a single cylinder, that is, below the lower ends of the stems 18 and 20 of the two intake valves for the cylinder, the cams 120 being so shaped and timed that these intake valves are open simultaneously.

When a piston of any one of the cylinders 1, 2 and 3 moves down to effect a suction stroke, the air and fuel mixture from the carburetor, a portion of which is always in the manifold 14, is drawn from the manifold 14 through the appropriate valve intake passages in the motor block, for example the passage 128 shown in Figure 5, into the chamber 130 in the cylinder head 132. Before or as the piston starts its return stroke the two valves through which the fuel and gas mixture has been drawn into the chamber 130 will be closed by their springs 22 and 24 and the return stroke of the piston will thus cause a compression of the mixture to an extent determined largely by the pressure upon the valve 134 exerted by the spring 136. This valve 134, which is seated in a depression in the cylinder head 132 and cooperates with a valve seat 138 surrounding the passage 140, controls the entrance of the now partially compressed fuel and gas mixture into the manifold 30, hereinabove described.

As hereinabove set forth, the manifold 30 communicates through a check valve 32 with a conduit 34 which serves to connect the manifold 30 with the intake manifold 10 for the power producing cylinders. The strength of the spring 142 which controls the check valve 32 may also be so determined that the fuel and air mixture in the manifold 30 will be under substantially a predetermined compression before it passes from the manifold 30 into the conduit 34 and thence into the intake manifold 10.

From the foregoing description it will be seen that, in a four cycle motor embodying the present invention in the illustrated form, the pistons of the respective cylinders 1, 2 and 3 will carry out two suction strokes and two compression strokes for each complete power cycle of the respective cylinders 4, 5 and 6. There will thus be two fuel intakes and two fuel compressions for each two rotations of the driving shaft and thus an ample supply of the fuel and air mixture will be supplied to the manifold 30 under preliminary compression and will be carried under pressure through the valve 32 and conduit 34 into the intake manifold 36 to supply a precompressed fuel-air mixture upon the suction stroke of each of the power pistons 4, 5 and 6. The amount of precompression may be varied. I have found in practice that, for a six cylinder motor, such as herein illustrated, in which three of the cylinders are used for precompression, a vastly improved operation, so far as fuel economy and maximum power development are obtained, is obtained with a precompression of from 10 to 15 pounds.

It will also be seen that, with this arrangement, there is not so much possibility of variation in the mixture at different speeds of operation of the motor since more time is given for the preparation and precompression of the fuel and air mixture before its combustion in the power cylinders.

In the preferred embodiment of the invention in a 6-cylinder motor illustrated in Figures 7 to 10, inclusive, instead of utilizing both the original intake and exhaust valves of the first three cylinders as intake valves, a different arrangement of the manifolds is made and each valve has a separate function.

In this embodiment of the invention the manifold 14 of the form of the invention shown in Figures 1 to 6, inclusive, is replaced by a manifold 143 connected only to the original intake valves of the first three cylinders. A second manifold 144 is connected to the original exhaust valves of the first three cylinders and receives the air and fuel mixture that has been compressed in these cylinders. This last mentioned manifold communicates with a chamber 146 in a valve housing 148 located between the manifold 144 associated with the first three cylinders and the intake manifold 150 for cylinders 4, 5 and 6. A spring pressed valve 152 has its seat in the upper wall of the chamber 146 and is provided with a stem 154 sliding in an upward extension 156 of the housing 148, the valve 152 being held normally seated by a spring 158.

The valve 152 controls the entrance of the precompressed fuel and air mixture from the manifold 144 and chamber 146 into the upper chamber 160 in the valve housing 148, the chamber 160 communicating, as hereinabove set forth, with the intake manifold 150 for the power cylinders 4, 5 and 6.

As shown more particularly in Figures 9 and 10, the intake and exhaust valves communicating with the cylinders 1, 2 and 3 are positively opened at predetermined times through connections to the cam shaft 162 which also has on it the cams that control the operation of the intake and exhaust valves for the power cylinders 4, 5 and 6. There is, however, this difference in the timing, which may be seen from an inspection of Figure 10, namely that for each complete rotation of the cam shaft 162 there will be two openings of the intake valve and two openings of the exhaust valve for each cylinder, the cam shaft 162 rotating once for each two rotations of the power shaft so that the openings of the intake valve for each piston will be timed to coincide with the suction strokes thereof and the openings of the exhaust valve for each piston will be timed to coincide with the completion of the compression strokes of said piston.

The valve lifting cams 164 for both the intake valve stems 166 and the exhaust valve stems 168 are of the same construction but are placed at different angular positions on the shaft 162. The pushers 170, located between the cams 164 and the respective intake and exhaust valve stems 166 and 168, are also of identical construction.

One of the advantages of the preferred embodiment shown in Figures 7 to 10, inclusive, over that shown in Figures 1 to 6, inclusive, is that it operates more quietly because of the absence of the ball valves shown in Figures 1 and 5 which, being in the engine head, are sometimes excessively noisy.

Although the invention has been shown in both illustrative embodiments as incorporated in a 4-cycle internal combustion motor, it will be apparent that it is equally applicable to a 2-cycle motor and that specific illustration of its embodiment in a 2-cycle motor is unnecessary for full understanding of the applicability of the invention thereto.

It will further be seen that with the usual timing of the cylinders of the six cylinder motor as herein shown there will always be in the intake manifold, after the engine is started, an ample charge of a combustible mixture of fuel and air under a preliminary pressure and with the fuel thoroughly diffused throughout the air. In other words, the mixture is prepared in advance of the suction stroke of the particular power cylinder in which it is to be used and the intake manifold is always above atmospheric pressure. One further advantage of having the fuel and air mixture under preliminary pressure in the intake manifold, in other words above atmospheric pressure, is that this insures a more uniform distribution of the fuel and air mixture to the various cylinders, a condition that does not always prevail when the intake is dependent entirely upon the suction stroke of the power cylinder.

As hereinabove pointed out, one of the great advantages of the present invention is that the preliminary mixing and compression of the fuel and air mixture permits the more thorough diffusion of the fuel and air throughout each other and thus permits an increase in the proportion of air employed in producing an explosive mixture. Thus when the fuel is the ordinary commercial gasoline which requires from 54.7 to 60 volumes of air to 1 volume of vaporized fuel for complete combustion it is possible, with the means of the present invention, to employ such proportions with satisfactory results. This is due to the fact that by the preliminary treatment of the fuel and air a mixture is prepared which approximates the ideal mixture for complete combustion.

A further important advantage of the invention is that it is readily adaptable to use with fuels of different volatility. In other words, it may be quickly adjusted for use with kerosene which required a considerably higher proportion of air to fuel vapor to produce a mixture that is readily combustible.

As hereinabove suggested, by having the fuel and air mixture in the intake manifold for the power cylinders above atmospheric pressure not only is uniform distribution of the fuel to the various cylinders insured, but filling of each cylinder to its displacement capacity is also insured so that the most effective power stroke is obtained for each power cylinder operation. This is so regardless of speed, a condition that does not hold where the intake into the power cylinders is dependent entirely upon suction.

What is claimed as new is:

1. An internal combustion motor having, in combination, a power cylinder and piston, said cylinder having associated therewith a valve controlled intake port for the combustion mixture and a valve controlled exhaust port for the gaseous products of combustion, a second cylinder and piston for effecting a partial preliminary compression of the combustion mixture, said second cylinder having associated therewith a valve controlled discharge port in communication with the intake port of said first mentioned cylinder and a valve controlled intake port for receiving a mixture of atomized fuel and air on the suction stroke of said last mentioned piston and carbureting means having operative connection with said last mentioned intake port, additional valve means being provided in the communication between the discharge port of said second cylinder and the intake port of said first cylinder to insure a predetermined compression upon the fuel and air mixture before it is released to the intake of said first cylinder.

2. An internal combustion motor according to claim 1 in which there are a plurality of power cylinders, an appropriate plurality of pistons and cylinders for effecting a preliminary compression of the combustion mixture, an intake manifold for the power cylinders, a manifold receiving the compressed fuel and air mixture from the valve controlled discharge ports of the preliminary compressing cylinders and a communication between said manifolds having therein a valve requiring a predetermined compression upon the fuel and air mixture before it is discharged into the intake manifold.

GUSTAV NEMNICH.

REFERENCES CITED

The following references are of record in the file of this patent:

UNITED STATES PATENTS

| Number | Name | Date |
|---|---|---|
| 1,988,082 | Latta | Jan. 15, 1935 |
| 1,992,400 | Smith | Feb. 26, 1935 |
| 2,100,064 | Zimmerman | Nov. 23, 1937 |